United States Patent [19]

Hasler et al.

[11] Patent Number: 4,618,163
[45] Date of Patent: Oct. 21, 1986

[54] AUTOMOTIVE CHASSIS

[76] Inventors: Franz Hasler, Am Hasel 3,, D-8071 Wettstetten; Ernst Mönch, Gaimersheimer Strasse 19, D-8070 Ingolstadt; Karl Reiter, Salvatorstrasse 16, D-8071 Wettstetten; Heinrich Timm, Chemnitzerstr. 7, D-8070 Ingolstadt, all of Fed. Rep. of Germany

[21] Appl. No.: 682,934

[22] Filed: Dec. 18, 1984

[30] Foreign Application Priority Data

Dec. 24, 1983 [DE] Fed. Rep. of Germany ....... 3346986

[51] Int. Cl.[4] ............................................. B62D 27/04
[52] U.S. Cl. .................................... 280/785; 296/187
[58] Field of Search ................ 280/785; 296/188, 189, 296/193, 194, 28; 180/89.1

[56] References Cited

U.S. PATENT DOCUMENTS 2,177,896 10/1939 Lee ......................................... 296/28
3,388,944 6/1968 Crehore ................................. 296/28
3,912,295 10/1975 Eggert ................................. 280/785
4,386,792 6/1983 Moore et al. ........................ 280/785
4,469,368 9/1984 Eger .................................... 280/785

FOREIGN PATENT DOCUMENTS 7721221 8/1979 Fed. Rep. of Germany .

OTHER PUBLICATIONS

Automobil-Industrie 3/1979; Aluminiumwerkstaffe fur den Automobilav.

Primary Examiner—Richard A. Bertsch
Attorney, Agent, or Firm—Karl Hormann

[57] ABSTRACT

An automotive chassis made from extruded light metal rods held together by connecting members also made from light metal. In a preferred embodiment the rods are tubular. Rods and connecting members are provided with complementary recesses or protrusions which permit their fitting together by axial or radial movement for initial provisional assembly without requiring flexing of the assembly during the insertion of the last members completing the assembly.

17 Claims, 2 Drawing Figures

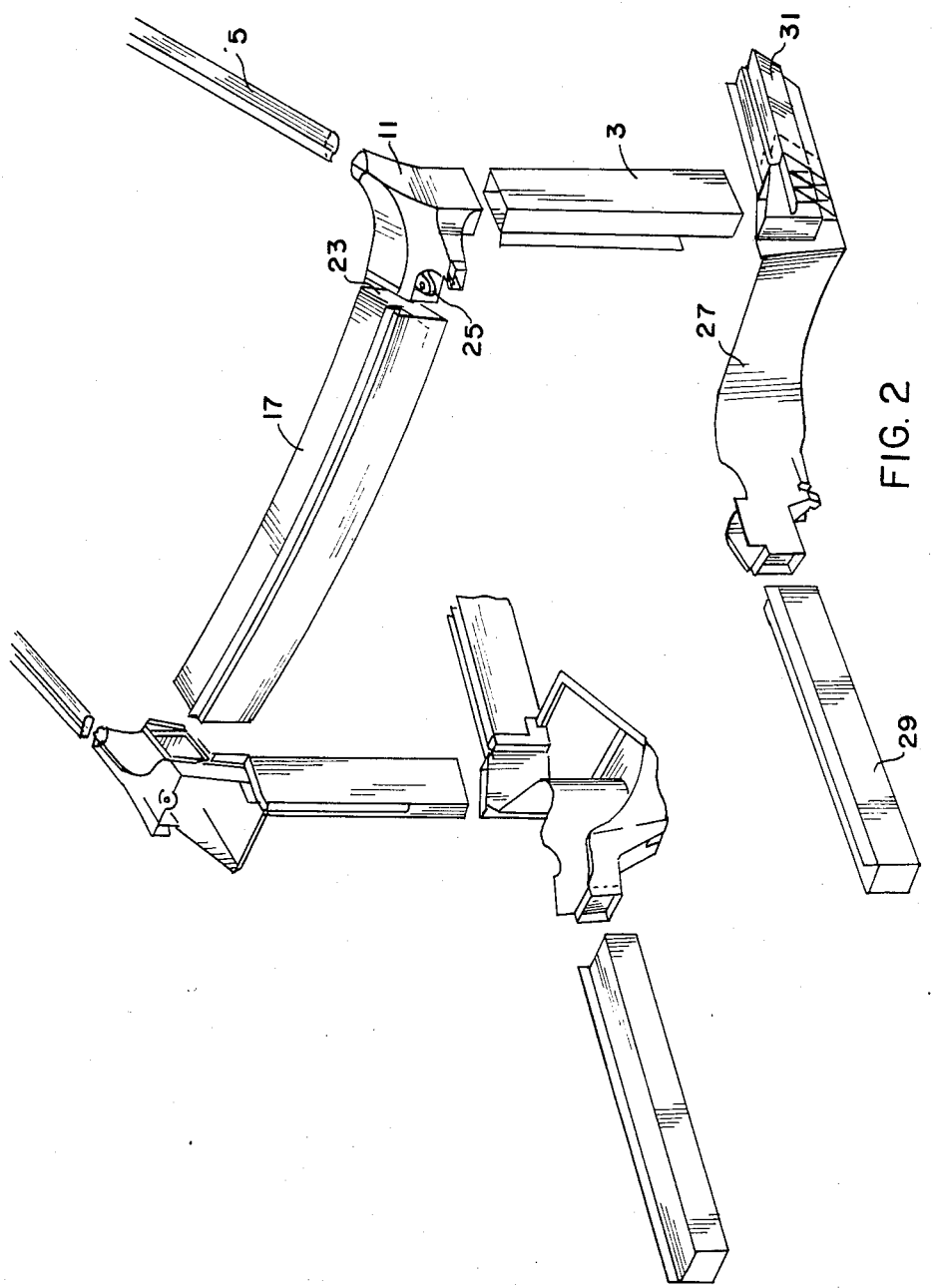

AUTOMOTIVE CHASSIS

BACKGROUND OF THE INVENTION

1. Field of the Invention

The invention relates to automotive chassis in general and, more particularly, to novel automotive chassis assembled from extruded and, preferably, tubular rods, for use in passenger automobiles.

2. Description of the Prior Art

Automotive chassis constructed from elongated tubular sections are well known. An example of such a chassis has been disclosed by German Utility Model No.: DE-GM 77 21 221 which teaches that tubular members may be connected together by press-fitting or clinching to form a chassis. The resultant structure may be of utility as a reinforcement for unitized body assemblies or as a frame for a two-wheeled vehicle. It would, however, be wholly unsuited as the support structure of an automobile; for simple tubular rods of circular configuration cannot, in the manner proposed, satisfy the stringent requirements placed upon such structural support members as thresholds, longitudinal braces or door posts of automobiles. To be suited for the mounting of adjoining components such as windows, gaskets, and the like, such tubular members would have to be specially shaped. Special cross-sectional shaping is required not only for the mounting of such members but also to permit such mounting without additional components, for reducing weight and for attaining predictable or controllable collision performance.

It is an object of the instant invention to provide an improved automotive chassis constructed of elongated, preferably tubular members.

A further object resides in the provision of an automotive chassis assembled from extruded tubular rods of light metal.

Another object of the invention is to provide a sturdy chassis constructed of tubular extruded rods and satisfying certain structural requirements.

Yet another object of the invention resides in providing a structure of light weight and great structural strenght.

It is also an object of the invention to provide a chassis adapted for low volume assembly.

Still another object is to provide a chassis assembled from extruded tubular rods cut to appropriate lengths from substantially endless stock and shaped to suit their intended function.

Other objects will in part be obvious and will in part appear below. The invention accordingly comprises the method and apparatus possessing the elements or combinations thereof, construction and arrangement of parts which are exemplified in the following detailed disclosure.

SUMMARY OF THE INVENTION

In the accomplishment of these and other objects, the invention, in a preferred embodiment, discloses an automotive chassis the supportive structure of which is made from light metal and comprises extruded tubular members of straight or curved configuration held together by connecting elements made by casting or forging and provided with receiving means for the tubular members, the receiving means being configured to engage either external or internal surface sections of the tubular members, the tubular members and the connecting members being of non-circular cross-section at their connections.

In a particularly advantageous embodiment of the invention one or more connecting members may be provided with extensions comprising supportive structures of the chassis and being of irregular configuration.

In a further embodiment of the invention the tubular members may in their end sections be provided with recesses or cut-outs whereby they may be attached to corresponding sections of the connecting members by movement in a direction normal to their longitudinal axes.

Furthermore, one or more of the connecting members may comprises internesting cup-shaped members adapted to be moved apart from each other for inserting, and moved toward each other for retaining, a tubular member.

Numerous advantages result from the use of extruded, preferably tubular, rods of light metal. They may be manufactured in cross-sectional configurations matching given requirements. They may be manufactured in substantially endless stock which may be cut to appropriate lenths as required. Other known advantages reside in the low specific gravity and high corrosion resistance of light metals, such as aluminum, which are, of course, particularly desirable features in connection with automobile construction. The tubular members may in some instances be configured in the shape of currently used sheet metal components; but they offer additional advantages unique to or inherent in extruded stock.

As a rule, tubular components used in assembling chassis in current manufacturing techniques, such as longitudinal braces or roof posts, are composites of two or more sheet metal stampings. Aside from the labor involved in assembling such parts, the manufacture of their components require substantial investments in such machine tools as presses and dies. Low volume production of vehicles made of such parts is, therefore, expensive. The use of parts from high production volume series for low volume series usually entails many compromises, and in any event limits the choice of design.

The novel connecting elements of light metal made in accordance with the invention may easily be adapted in an improved manner to suit their intended purpose in critical locations within a chassis. By contrast, currently used connecting members made from sheet metal are often too limited in their applicability as a result of the manner in which they are manufactured; moreover, often they require complicated welding apparatus for their assembly.

The end sections of the novel extruded tubular members are advantageously configured to mate with correspondingly shaped receiving elements in the connecting members. Such interfitting configurations permit safe initial assembly of the components into chassis without special mounting or assembly jigs, which is important or advantageous in situations, for instance, where the components must be maintained in a given orientation during the curing or hardening of cements used to secure the final assembly.

In contrast to chassis components made from sheet metal stampings which require expensive presses, dies, and welding apparatus for their manufacture, manufacturing the connecting members in accordance with the invention requires relatively small investment. Other advantages inherent in the connecting members of the present invention reside in the fact that they may easily be adapted to serve other purposes as well, by providing them with integral brackets or flanges for the mounting of other functional components. The connecting members may be manufactured by injection molding or casting or forging aluminum. The recently developed process of superplastic shaping is particularly well suited for manufacturing connecting members in accordance with the invention.

As stated above, the tubular members, or some of them, may at at least one of their ends be provided with a recess or cut-out for mating with a correspondingly shaped protrusion on a connecting element, by movement in a direction substantially normal to their longitudinal axis. This is of significant advantage; for if all tubular members were assembled by inserting their end sections into recesses in the connecting members, the last member to be mounted into, and completing, a chassis could be mounted with difficulty only and would require bending or flexing the structure. Another advantage resulting from the form fit between elongated members and connecting members in accordance with the invention is the ease with which repairs may be executed. The elongated members may be secured to the connecting members by any of the known fastening methods such as welding, soldering, cementing, or by screws, rivets and so forth.

The connecting members may comprise complementary pairs of internesting substantially cup-shaped members. This would simplify their manufacture by die casting, for instance. By forming them as separable parts, the cup-shaped members may be moved away from each other, or they may be moved toward each other and clamped or otherwise held together, thus rendering the insertion and securing of the elongated members particularly easy.

The assembly of chassis with elements in accordance with the invention may further be simplified by manufacturing the connecting members with integral fixtures or brackets for the mounting of other components. Such integral fixtures may comprise flanges for mounting windshield wipers or door hinges for instance. Known structures, by contrast require separate fixtures or brackets for similar purposes.

BRIEF DESCRIPTION OF THE DRAWINGS

For a fuller understanding of the invention reference should be had to the following description taken in connection with the accompanying drawings, in which FIG. 2 depicts the support structure of the vehicle shown in FIG. 1, in the section connecting the passenger compartment to the engine compartment.

Figure 1:
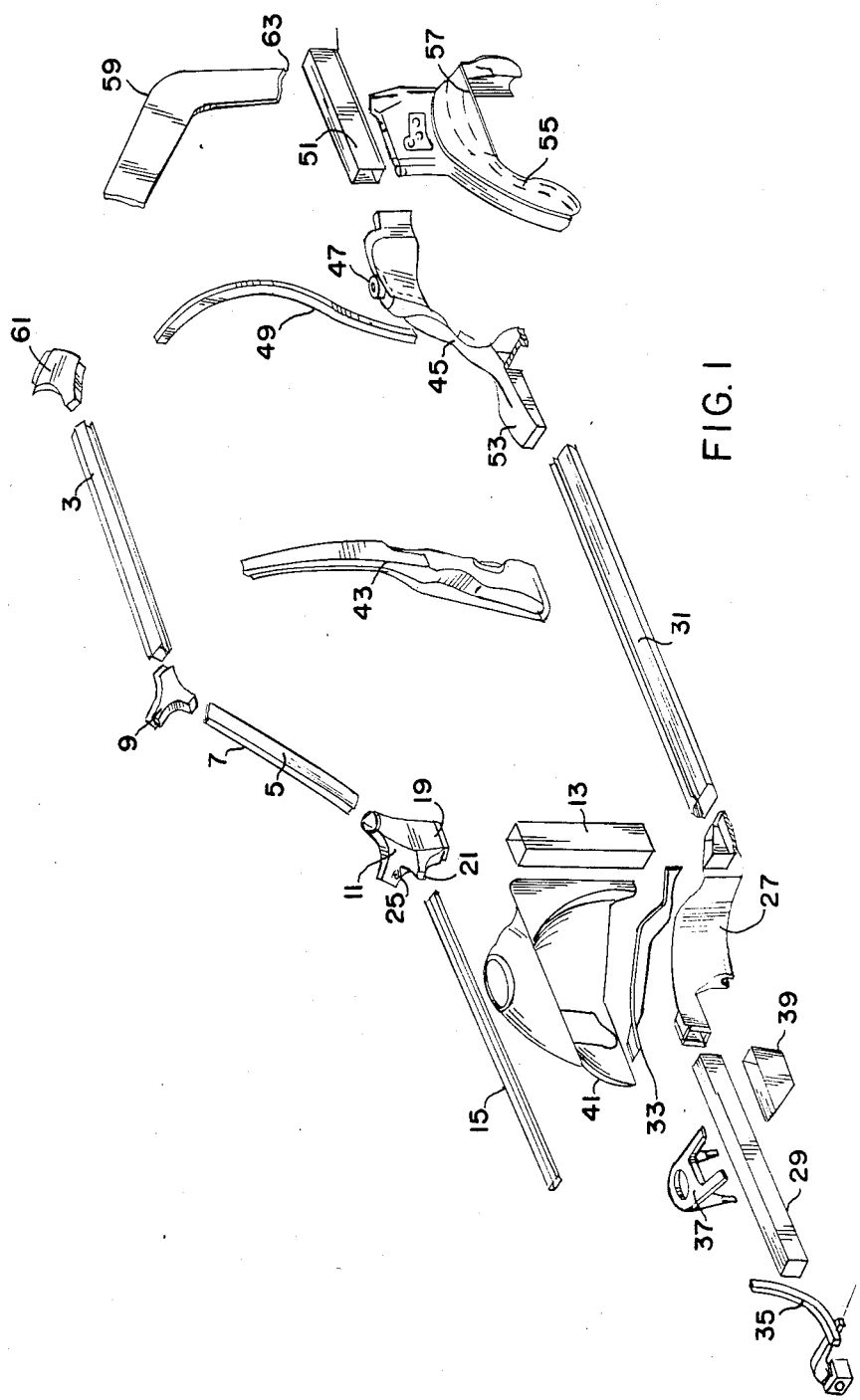
FIG. 1 is an exploded view, in perspective, of structural parts forming the left side of an automobile chassis.

The components depicted in the exploded view of FIG. 1 may, for convenience, be divided into three groups. One group comprises extruded elongated and preferably tubular members made from a light metal such as aluminum. These members are of uniform cross-section throughout their length. They may thus be made from endless stock cut to sections of appropriate lengths and, in some instances, bent or curved as required to fit their purpose. It will be appreciated by persons skilled in the art that members which are not bent or curved may be used on either side of a symmetrically constructed chassis, thus adding to the economies derived from their use.

The second group is constituted of connecting members of various configurations, and preferably made from light metal by casting or forging or superplastic shaping. For the convenience of describing their function of joining elongated members, the connecting members will hereinafter be referred to as joints. Not only are they used for connecting together various elongated members, but at least some of the joints may be used for the mounting of other components as well. For instance, they may be provided with bosses, recesses, abutments and the like for mounting such other components.

The third group is comprises of support members some of which may be made from sheet materials such as ferrous sheet metal, light metal sheets, or even plastic sheet material. The components in this group are more economically manufactured from stampings than by casting or extrusion processes, and being made from stampings they may as a rule be lighter than similar parts made by casting, forging, etc.

The individual members are for the most part connected by mating or joining interfitting portions thereof. In some instances this may require especially formed end sections of the components, as will be explained infra. In addition to being joined together in the manner of this invention, the components may be secured by other known means. For example, where components of different materials are to be connected to each other, adhesive cements have been found to be particularly useful.

The following is a more detailed description of the members and their connections as depicted in the drawings.

FIG. 1 shows a lateral; roof support brace 3 comprising a straight section cut from endless extruded stock. This and other members subsequently described may advantageously be tubular or of any cross-sectional configuration adapted to lend both strength and light weight to the chassis. Made by a method similar to that of brace 3, but being of a different cross-section, is a forward roof support post 5. The post 5 is provided with a lateral flange 7 to which a window (not shown) may be attached. The post 5 is part of a door frame. The ends of the roof support brace 3 and of the post 5 facing each other are retained in a forward connecting member or joint 9. The joint 9 comprises two internesting and complementary substantially cup-shaped members one of which faces the inside of the chassis, the other facing outwardly. The members may be moved apart to provide openings into which the ends of the lateral roof support brace 3, of the post 5, and of a transverse roof brace (not shown) may be inserted. Once these three members have been inserted into the joint 9, the two members thereof are moved towards each other and clamped or tightened together. While the joint 9 is still in its open condition, the elongated members may be secured to it by a cement, by screws, or by other fastening means, in a manner well known in the art.

The end of the roof post 5 facing away from the joint 9 is received in a further joint 11. The joint 11 is adapted to join together four different components, i.e., in addition to the roof post 5 other elongated members are anchored in it. These are shown to be a forward door post 13, a fender support brace 15, and a transverse girder 17 (FIG. 2). The forward door post 13 and the fender support brace 15 are made by an extrusion process; they are anchored in the joint 11 in a manner so as to extend at a substantially right angle relative to each other. As shown in the drawing, they are mounted upon extensions 19 and 21, respectively, of the joint 11, the outer contour of the extensions corresponding to, or complementing, the inner contour of recesses or cut-outs in the elements 13 and 17. In contrast to the joint 9 the joint 11 cannot be opened as it does not comprise two separable members.

In order to avoid difficulties in the insertion of the elongated members mounted last to complete the chassis, into their associated joints, it may be necessary or at least desirable that some of the joints be openable in the manner of the forward joint 9, for instance, or that provision be made for connecting the elongated members to the joints in a manner which does not involve axial movement of the elongated members, as that would require bending or flexing the assembly. One way of accomplishing this has been shown in the connection of the transverse girder 17 with the joint 11. The transverse girder 17 is for this purpose provided with a recess or cut-out in each of its ends, the shape of the recesses complementing the shape of an integral protrusion of the joint 11. It is thus possible to align and connect the slightly arcuate transverse member 17 to the joint 11 by moving the end of the member 17 in a direction substantially normal to its longitudinal axis (FIG. 2) over the protrusion of the joint 11. As shown in FIG. 2, a forward portion of the joint 11 is additionally provided with an integral flange 25 having a bore therein to which a windshield wiper, for instance, may be attached.

The lower end of the forward door post 13 is anchored in a joint 27. As shown in FIG. 2, the joint 27 is of complex shape and serves to connect a forwardly extending longitudinal brace 29 with a threshold member 31 in a laterally offset manner. That is to say, the joint 27 serves not only as a three point connection between the forward door post 13, the forward longitudinal brace 29, and the threshold member 31, but it also functions itself as a longitudinal support. The joint 27 has been shown to be open on, or to be provided with a furrow, as it were, in its upper surface which extends the length of the joint 27. This simplifies the manufacture of the joint 27 in an efficient manner by a casting process. The furrow may be closed by a closure 33 either before the assembly if brace 29 and threshold 31 are inserted by movement in the direction of their axes, or it may be left open until after the brace 29 and the threshold member 31 have been placed into the furrow. The forward brace 29 is adapted to support a plurality of components which may all be made from sheet metal stampings. For instance, as shown, the components may comprise a bracket 35 for a spoiler (not shown) welded to the forward end of the brace 29, a boss 37 for an engine mount (not shown), a bracket 39 for an auxiliary frame (not shown), and a wheel housing 41. The latter may additionally be affixed to the forward door post 13, the connecting member 27, and to the brace 15.

For reasons of economy a center support post 43 extending between the roof support 3 and the threshold member 31 is fabricated from sheet metal stampings.

The rear end of the threshold member 31 extends into a rear connecting member or joint 45 which also serves as a support 47 for a helical spring or shock absorber (not shown). In addition to the threshold 31, the joint 45 supports a door support 49 and a straight rearwardly extending brace 51. The door support 49 may be made from a curved extruded member. The connection between the joint 45 and the elongated members may be substantially the same as the one described above. An extension 53 of the joint 45 is shown to have a large surface area and serves to insure an improved distribution of large forces or loads between the joint 45 and the threshold 31.

The rear joint 45 also supports a rear wheel housing 55 adjacent the support 47. A rear post 59 is connected to a rear surface portion 57 of the wheel housing 55. The upper end of the post 59 is seated in an upper connecting member or joint 61. The rear post 59 may also be formed as an extruded member cut to appropriate length and bent to suit its intended purpose. The lower end of the post 59 is provided with a flange 63 by means of which it may be affixed to the wheel housing 55, for instance.

As will be appreciated by those skilled in the art, the description set forth herein merely describes illustrated embodiments of the invention and that changes may be made without departing from the scope or spirit of the invention. It is believed that the principles of the invention and the advance in the art accruing therefrom will be apparent to those persons being skilled in the art.

What we claim is:

1. An automotive chassis, comprising:
   a plurality of tubular members connected together to form a support structure, each tubular member comprising at least one axially extending integral portion of non-circular cross-section; and
   means for connecting said tubular members by at least partially internesting engagement with said axially extending non-circular portions and comprising a plurality of means for receiving said non-circular portions and complementing the cross-section thereof for internesting therewith.

2. The chassis of claim 1, including at least one tubular member of straight configuration.

3. The chassis of claim 1, including at least one tubular member of curved configuration.

4. The chassis of claim 1, wherein said tubular members and said connecting means comprise aluminum.

5. The chassis of claim 1, wherein at least one of said receiving means comprises an extension of at least one of said connecting means and constitutes an integral portion of said support structure.

6. The chassis of claim 5, wherein said extension is laterally offset from said connecting means.

7. The chassis of claim 5, wherein said extension comprises means for connecting a threshold member and a forward member.

8. The chassis of claim 7, wherein said threshold member and said forward member are laterlly offset relative to each other.

9. The chassis of claim 8, wherein said forward member is positioned adjacent a forward wheel housing.

10. The chassis of claim 5, wherein said extension comprises means for connecting a threshold member to a rearward member and to an upright member and further comprising means for mounting shock absorbing means.

11. The chassis of claim 1, wherein at least one of said connecting means comprises axially aligned cup-shaped internested members mounted for movement between a first position in which an axially extending non-circular portion of a tubular member may be retained between said cup-shaped members and a second position position in which said non-circular portion may be released from said connecting means.

12. The chassis of claim 11, wherein said cup-shaped members are provided with an undulation at their margins for retaining a non-circular portion of at least one tubular member therein.

13. The chassis of claim 1, wherein at least one of said tubular members comprises at least one cut-out section whereby said at least one tubular member may be connected to a connecting means by movement in a direction substantially normal to the longitudinal axis of said tubular member.

14. The chassis of claim 1, wherein at least one of said connecting means is die cast.

15. The chassis of claim 1, wherein at least one of said connecting means is forged.

16. The chassis of claim 1, wherein at least one of said receiving means comprises a male member received within a non-circular portion of a tubular member.

17. The chassis of claim 1, wherein at least one of said receiving means comprises a female member within which a non-circular portion of a tubular member is received.

* * * * *